May 19, 1942.    J. L. CKOLA    2,283,314
HYDRO DENTAL BRUSH
Filed Aug. 1, 1940
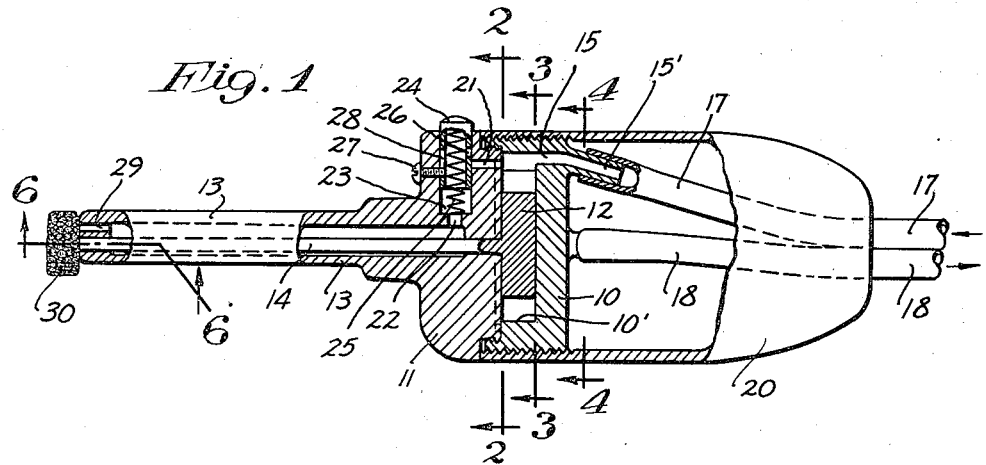
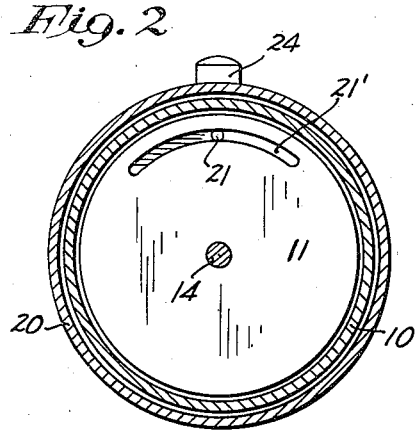
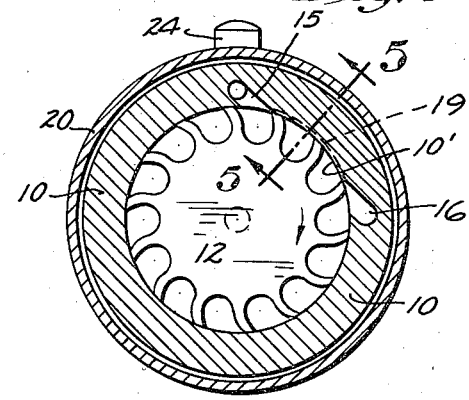
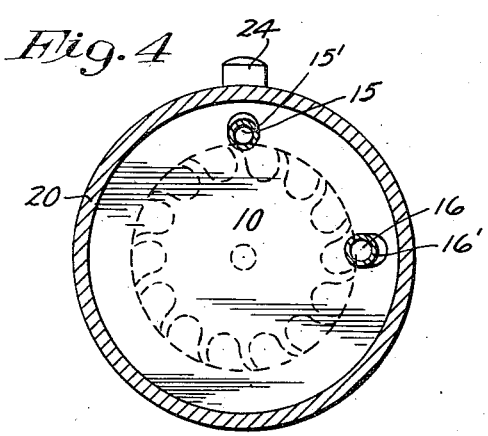
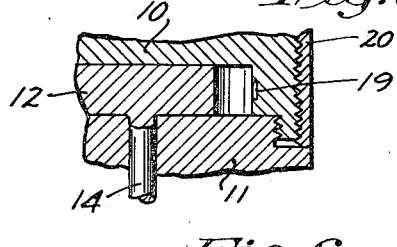
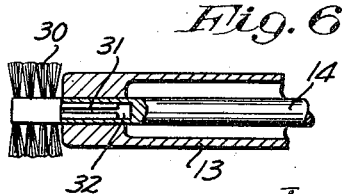
Inventor
John L. Ckola
By his Attorneys
Merchant & Merchant Patented May 19, 1942

2,283,314

UNITED STATES PATENT OFFICE 2,283,314

HYDRODENTAL BRUSH

John L. Ckola, Chippewa Falls, Wis.

Application August 1, 1940, Serial No. 349,131

3 Claims. (Cl. 15—24)

My invention provides an extremely simple and highly efficient hydro dental brush and, generally stated, consists of the novel devices, combinations of devices and arrangement of parts hereinafter described and defined in the claims.

The device is especially designed for use as a toothbrush, but the brush may take various forms and the device may be used for various operations analogous to the brushing or scouring of teeth. The device is of such nature that the brush proper can be used dry or water may be by-passed in any desired amount to or through the brush while it is in operation.

A preferred form of the device is illustrated in the accompanying drawing wherein like characters indicate like parts throughout the several views.

Referring to the drawing:

Fig. 1 is a view partly in side elevation and partly in axial section showing the improved device;

Fig. 2 is a transverse section taken on the line 2—2 of Fig. 1;

Fig. 3 is a transverse section taken on the line 3—3 of Fig. 1;

Fig. 4 is a transverse section taken on the line 4—4 of Fig. 1;

Fig. 5 is a fragmentary section taken on the line 5—5 of Fig. 3; and

Fig. 6 is a fragmentary section taken on the line 6—6 of Fig. 1.

The chief elements of the device are a cylinder block 10, a cylinder head 11 and a rotor or toothed wheel 12. The head 11 is shown as detachably secured to the block 10 by threaded engagement. The block 10 is formed with a cylindrical chamber 10' which, when the head 11 is applied, fits the rotor 12 with close but free running engagement. The head 11 is provided with a projecting tubular stem 13, and the rotor 12 is provided with a shaft 14 that extends axially therefrom and is journalled in said head 11 and in the extreme outer end of the tubular stem 13. Shaft 14 is shown as formed integral with the rotor 12 but may be separately formed and otherwise rigidly secured to said rotor.

The cylindrical chamber 10' is provided with a peripheral intake port 15 and a similar outlet port 16. These ports 15 and 16 are preferably formed respectively with nipples or tubular extensions 15' and 16' that are connected to flexible tubes 17 and 18. For an important reason the ports 15 and 16 are connected by a segmental groove 19, see particularly Figs. 3 and 5. This groove or channel 19 can be shallow and, for that matter, narrow so that it permits a slight but definite flow of water or motive fluid from the port 15 to the port 16 whenever water pressure is turned on.

The block 10 is enclosed in a shell-like casing 20 that forms a housing and a convenient handpiece by means of which the device may be gripped with one hand. This casing, as shown, is screw-threaded on to the block 10.

The cylinder head 11 has a by-passage that leads from the intake port 15 to the interior of the stem 13 but is normally closed by a cut-off valve. This by-passage includes ports 21 and 22 and seat 23 in which is mounted a cap-like valve 24. Valve 24 is subject to a coiled spring 25 that normally holds the same positioned as shown in Fig. 1 and, hence, the by-passage closed. Valve 24 has a port 26 that is normally out of line with the port 21 but is adapted to be aligned therewith by depression of the valve 24. Extreme movements of valve 24 is limited by a stop screw 27, or the like, that normally engages in a slot 28 of said valve. In its extreme end the stem 13 is provided with a small discharge port or passage 29 that opens against the side of a brush 30. This brush 30 is detachably secured to the extended end of shaft 14 by any suitable or well known means but, as shown, said brush is provided with a split stem 31 that is telescoped under friction into a recess 32 formed in the end of shaft 14. Port 21 has a segmental extension groove 21' formed in the face of head 11.

Operation

The operation of the device is probably evident from the foregoing but may be briefly summarized as follows. When water or other motive fluid under pressure is delivered to the port 15 through tube 17, it will be caused to flow from port 15 to port 16 and flowing against the teeth of the rotor 12, will rotate the latter, its shaft 14 and the brush 30 in a clockwise direction in respect to Fig. 3. The flow out through the port 16 and discharge pipe 18 will, of course, be much freer than the flow through the port-connecting groove or channel 19, so that the rotor will be rotated at very high velocity.

When the valve 24 is in normal position, there will be no flow of water to the brush but when said valve is depressed, a small part of the water will flow to the brush through ports 21 and 26 and this small stream of water will then be discharged from port 29 against and through the brush. When the hand is applied around the casing 20, the thumb will naturally overlie or be in the vicinity of a projecting end of valve 24 so that the latter can be easily manipulated so as to supply just the right amount of water to the brush.

The annular groove or extension 21' of port 21 will keep said port 21 in communication with the water delivered to the rotor regardless of the exact limit of rotation of the head 11 in screwing the same tightly to its seat against the cylinder block 10. Of course, the clearance between the shaft 14 and the bore of the stem 13 will permit free flow of water from port 22 to port 29.

A preferred form of the device has been illustrated, but it will be understood that modifications thereof may be made within the scope of the invention herein disclosed and claimed.

It will, of course, be understood that the various parts of the device described may be made of any suitable material. However, in practice, I propose to make the rotor 12 and its shaft 14 and the cylinder block 10 of metal and to make the elements 11—13—20 of molded plastic material such as Bakelite, for example.

What is claimed is:

1. In a device of the kind described, a cylinder block formed in one face with a cylindrical rotor seat having circumferentially spaced fluid inlet and outlet ports, a cylinder head detachably secured to said cylinder block and closing the open side thereof, said head having an axially projecting tubular stem, said cylinder head having a valve-equipped by-passage leading into said tubular stem from that part of said cylinder block that is in communication with its intake port, a peripherally toothed rotor mounted in said rotor seat and having a shaft extended outward through the stem of said cylinder head with clearance for the flow of water through said stem, the said clearance space having a discharge passage opening at the extreme end of said stem, and the outer end of said shaft, adjacent to said discharge passage, being equipped with a brush-like head, and an outer casing detachably secured to said block and cylinder head and said casing having approximately the same diameter as said cylinder head and being of a diameter adapted to be readily gripped in the hand of the operator.

2. The structure defined in claim 1 in further combination with supply and discharge tubes extended into said casing and connected respectively to the intake and outlet ports of said cylindrical rotor seat.

3. The structure defined in claim 1 in which said cylinder head is connected to said cylinder block by screw-threaded engagement and in which the receiving end of said by-passage terminates in a circumferentially extended groove formed in the inner face of said piston head.

JOHN L. CKOLA.